United States Patent [19]

Donley

[11] Patent Number: 5,003,916

[45] Date of Patent: Apr. 2, 1991

[54] ADHESIVE SUPPLY UNIT

[75] Inventor: Paul J. Donley, Monterey, Calif.

[73] Assignee: Graco Inc., Minneapolis, Minn.

[21] Appl. No.: 179,518

[22] Filed: Apr. 8, 1988

[51] Int. Cl.$^5$ .............................................. B05C 11/10
[52] U.S. Cl. ................................... 118/429; 118/666; 118/202; 219/421
[58] Field of Search ............... 118/429, 202, 410, 666; 219/421, 420, 400, 423, 422

[56] References Cited

U.S. PATENT DOCUMENTS

| | | | |
|---|---|---|---|
| 3,189,022 | 6/1965 | Melsky | 219/421 X |
| 3,326,415 | 6/1967 | Estabrooks | 219/421 X |
| 3,352,278 | 11/1967 | Lockwood | 118/202 X |
| 3,352,279 | 11/1967 | Lockwood | 118/261 X |
| 3,964,645 | 6/1976 | Scholl | 219/421 X |
| 4,308,447 | 12/1981 | N',uml/o/ tzold et al. | 118/202 X |
| 4,505,669 | 3/1985 | Rogers | 219/420 X |
| 4,598,841 | 7/1986 | Sticher et al. | 219/422 X |
| 4,601,279 | 7/1986 | Guerin | 219/400 X |
| 4,641,764 | 2/1987 | Faulkner, III | 219/421 X |
| 4,666,066 | 5/1987 | Boccagno et al. | 219/421 X |

*Primary Examiner*—Shrive Beck
*Assistant Examiner*—Alain Bashore
*Attorney, Agent, or Firm*—Douglas B. Farrow

[57] ABSTRACT

An adhesive supply unit is provided with a tank having fins which maximize the heat exchange area of the tank for melting hot melt adhesive. Each fin features a cut out which is of such a size and shape as to allow the placement of a block of unmelted adhesive in the tank while at the same time maximizing the surface area of the fins to improve heat transfer. An electronics control unit is located adjacent one end of the tank and has a fan located in the top of the cabinet over the control unit which fan blows in ambient air from the outside downwardly over the electronic controls contributing to an efficient cooling of the electronics. A coupler is used to align the pump and air motor located on the bottom of the device consists of a sleeve which supports the shaft and an outer bore which fits into corresponding bores in both the air motor and pump thereby aligning all three items and providing a sealing function as well.

1 Claim, 3 Drawing Sheets

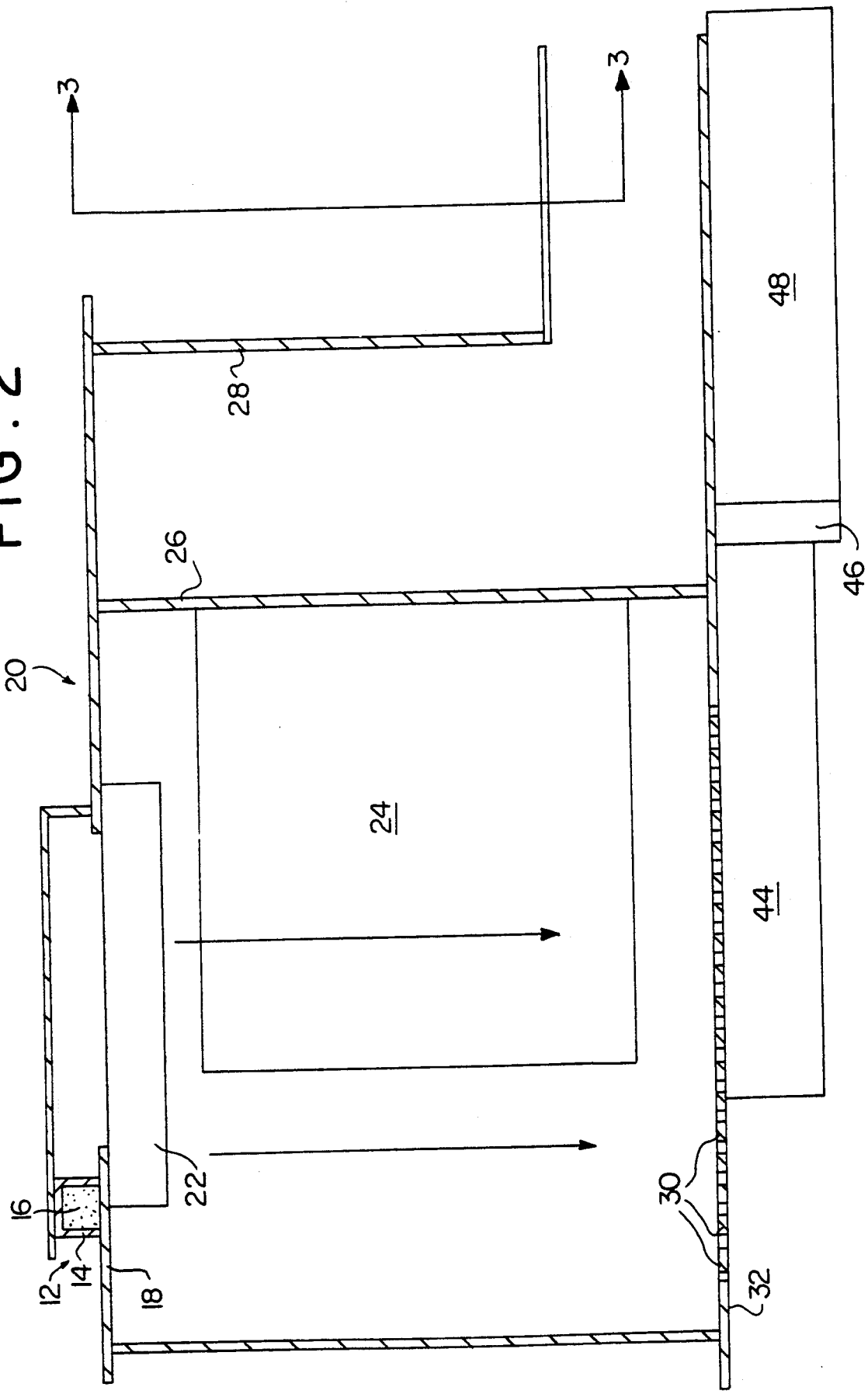

ADHESIVE SUPPLY UNIT

BACKGROUND OF THE INVENTION

Hot melt adhesive supply units are in general well known. As the need for application becomes more sophisticated, increasing amounts of control have been provided for such supply units. Such needs necessitate the provision for sophisticated electronics in the unit. The environments for such electronics is quite hostile however as the amount of heat required to melt the hot melt is substantial and thus provision needs to be made for protecting the delicate electronics in the environment.

For efficient operation, it is also desirable to be able to melt blocks of hot melt as quickly as possible. It is generally considered well known to increase the surface area of the tank by providing fins therein and it is therefore an object to this invention to provide a device which is capable of quickly melting the raw hot melt.

It is also an object to this invention to provide a device which may be easily and inexpensively manufactured and which is capable of rapid yet accurate assembly in sealing.

SUMMARY OF THE INVENTION

In the instant invention, the hot melt adhesive tank is provided with fins which extend across and which extend at least in part substantially the height and width of the tank. The fins have a recess in the center thereof of approximately the width and depth of a block of hot melt so as to allow placement of full uncut blocks in the tank while at the same time maximizing the surface area for heat transfer.

The cooling apparatus for the instant invention is provided by a fan located in the top of the cabinet located directly over the electronics of the control unit. The electronics are mounted adjacent one end of the tank and as such are subject to a substantial amount of heat. By blowing ambient cool air downwardly over the electronics, increased cooling efficiency is provided even through contrary to the normal direction of flow from convection cooling. The intake for the ambient air faces forwardly away from the heat source of the tank.

A cylindrical bearing member is provided between the air motor and the pump which are located beneath the cabinet body and serve to align the pump and motor relative to one another as well as locate and seal the shaft that runs between the two units. Due to the construction, alignment is assured and assembly is greatly facilitated.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a perspective view of the instant invention.
FIG. 2 is a sectional view taken along line 2—2 of FIG. 1.
FIG. 3 is a sectional view taken along line 3—3 of FIG. 2.
FIG. 4 is a longitudinal cut away view showing the bearing assembly located between the air motor and pump underneath the cabinet.

DESCRIPTION OF THE PREFERRED EMBODIMENT

Figure 1:
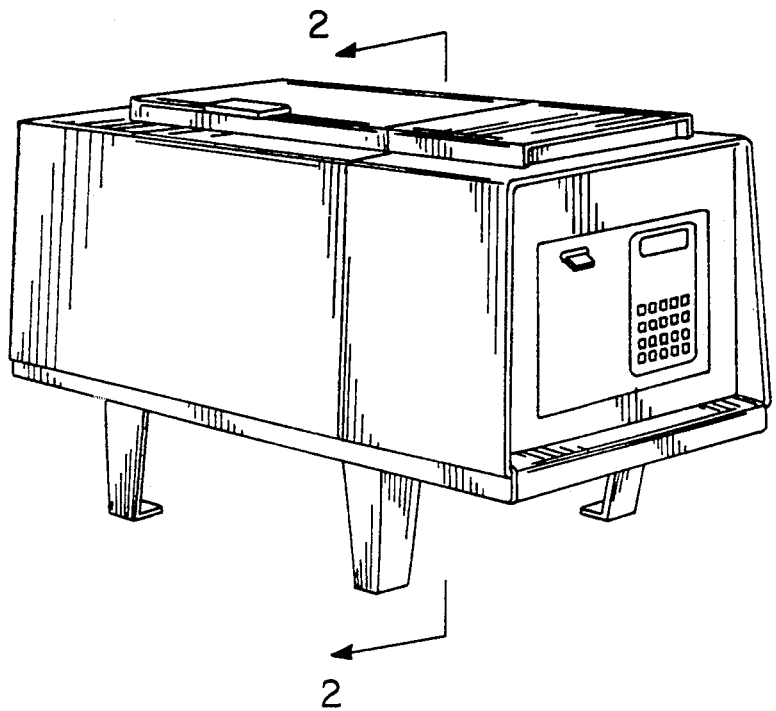

FIG. 1 shows the hot melt adhesive supply unit 10. As seen more particularly in FIG. 2, an air intake unit 12 is formed of a U shaped piece of perforated metal 14. A foam filter element 16 located in the top 18 of cabinet 20. Air is drawn through filter element 16 by fan 22 and blown downwardly over the electronics control package 24. Electronics control package 24 for controlling the temperature of adhesive in the tank is located on a dividing wall 26 immediately adjacent tank 28 and is thus in a position to deletriously be affected by heat unless properly cooled. The air continues downwardly through holes 30 in the bottom 32 of cabinet 20.

Figure 3:
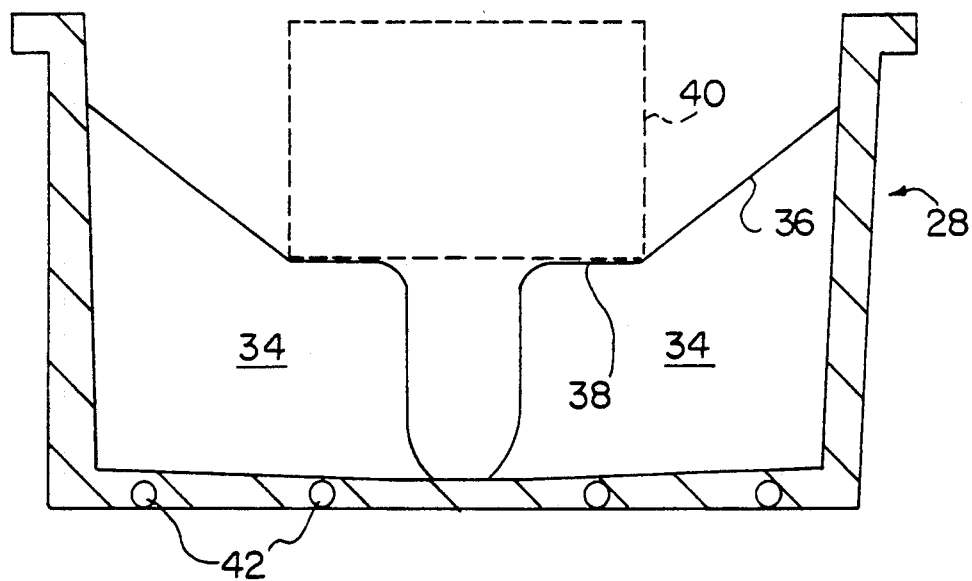

FIG. 3 shows in detail tank 28. Each fin 34 extends substantially the width and height of the tank to maximize surface area. An indentation is formed in the middle where downwardly sloping edges 36 meet at horizontal shelf 38 which is of such a width as to allow an unmelted block of hot melt adhesive (shown in phantom as 40) to be placed. Heating element 42 is placed in the bottom of the tank to cause the melting.

Figure 4:
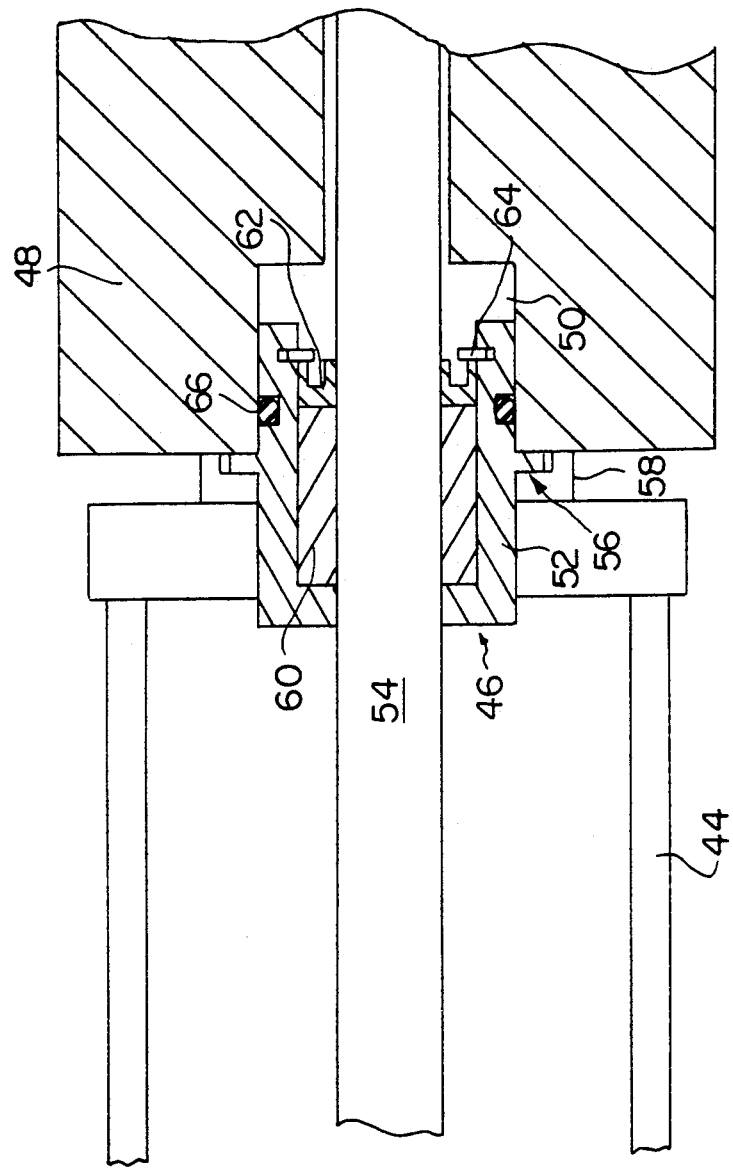

FIG. 2 also shows located beneath the bottom 32 of cabinet 20 an air motor 44 which is connected to pump 48 using bearing housing 46. Turning to FIG. 4, bearing housing 46 is generally cylindrical in shape and fits into an aperture 50 in pump 48 and aperture 52 in air motor 44. A shaft 54 runs through the middle of the adapter and is supported and aligned thereby. A flange 56 seats against the end of pump 48 and is held in place by a collar 58 which is in turn clamped in place by the end of air motor 44. A bearing member 60 slideably locates shaft 54 in the middle and a wiping seal 62 is located at the end thereof. Seal 62 is held in place by a snap ring 64. A seal 66 acts to form a seal between bearing housing 46 and pump 48. This construction assures constant alignment between the two members while at the same time being easy to manufacture and assemble as well.

It is contemplated that various changes and modifications may be made to the adhesive supply unit without departing from the spirit and scope of the invention as defined by the following claims.

What is claimed is:
1. An adhesive supply unit comprising:
   a tank having first and second ends, a top and a bottom;
   means for heating said tank adjacent said tank bottom;
   an electronic control mechanism for controlling the temperature of adhesive from said tank, said control mechanism being located adjacent said tank first end;
   a cabinet having a top and substantially containing said tank and said control mechanism;
   a fan located in said cabinet top above said control mechanism and oriented so as to blow ambient air from outside said cabinet downwardly across said control mechanism; and
   an inlet in said cabinet top for ambient air for said fan, said opening facing away from said tank.

* * * * *